US008718867B2

(12) United States Patent
Monti

(10) Patent No.: US 8,718,867 B2
(45) Date of Patent: May 6, 2014

(54) METHOD AND SYSTEM FOR DIAGNOSING THE OPERATING STATE OF AN ASSISTED STARTING SYSTEM OF A MOTOR VEHICLE

(75) Inventor: Alessandro Monti, La Garenne Colombes (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 546 days.

(21) Appl. No.: 13/057,210

(22) PCT Filed: Jul. 20, 2009

(86) PCT No.: PCT/FR2009/051440
§ 371 (c)(1),
(2), (4) Date: Apr. 18, 2011

(87) PCT Pub. No.: WO2010/015765
PCT Pub. Date: Feb. 11, 2010

(65) Prior Publication Data
US 2011/0190979 A1    Aug. 4, 2011

(30) Foreign Application Priority Data

Aug. 4, 2008   (FR) ..................................... 08 55385

(51) Int. Cl.
*G06F 17/00* (2006.01)
*G06F 19/00* (2011.01)
*G01M 17/00* (2006.01)

(52) U.S. Cl.
USPC ............... 701/36; 701/70; 701/29.2; 340/438

(58) Field of Classification Search
USPC ............. 701/1, 36, 45, 48, 49, 70, 78, 79, 80, 701/93, 29.1, 29.2, 29.3, 29.4, 29.6, 29.7, 701/29.8, 30.3, 30.5, 30.8, 30.9, 31.1, 32.1, 701/31.3; 340/425.5, 438, 439
See application file for complete search history.

(56) References Cited

U.S. PATENT DOCUMENTS

| 2004/0024513 | A1 | 2/2004 | Aizawa et al. |
| 2004/0254709 | A1 | 12/2004 | Kustosch et al. |
| 2008/0319624 | A1 | 12/2008 | Aizawa et al. |

FOREIGN PATENT DOCUMENTS

| DE | 10 2006 026 735 | 12/2007 |
| FR | 2 845 958 | 4/2004 |

OTHER PUBLICATIONS

International Search Report Issued Aug. 31, 2010 in PCT/FR09/051440 filed Jul. 20, 2009.

*Primary Examiner* — Thomas Tarcza
*Assistant Examiner* — Edward Pipala
(74) *Attorney, Agent, or Firm* — Oblon, Spivak, McClelland, Maier & Neustadt, L.L.P.

(57) ABSTRACT

A method of diagnosing an operating state of an assisted starting system of a motor vehicle equipped with a controlled parking brake, the method including calculating at least one item of vehicle information, generating at least one item of validity information associated with the vehicle information, recording in a non-volatile memory vehicle information and associated validity information during a command to disengage the parking brake, and providing at least one item of diagnostic information from a verification of the validity of the recorded information.

14 Claims, 5 Drawing Sheets

METHOD AND SYSTEM FOR DIAGNOSING THE OPERATING STATE OF AN ASSISTED STARTING SYSTEM OF A MOTOR VEHICLE

The invention relates to a method and a system for diagnosing the operating state of an assisted starting system of a motor vehicle.

In particular, the invention relates to a motor vehicle equipped with a controlled parking brake.

Currently, some motor vehicles are equipped with an assisted starting system which consists in automatically controlling the releasing of the parking brake when starting the vehicle. The parking brake is an additional braking system, over and above the brakes actuated by the brake pedal, intended to immobilize the vehicle when the latter is stopped.

The automatic parking brake release command makes it possible to assist the driver in starting on a slope, also called "hill start". The principle of starting on a slope is to release the brakes on the non-drive wheels when the torque transported by the engine to the drive wheels is sufficient to compensate for the slope effect.

One of the problems encountered when using the assisted starting system is that the automatic brake release command may, in certain conditions, be compromised. In practice, in the event of a malfunction of the assisted starting system, a parking brake release command may be issued by the system even though all the conditions are not satisfied for authorizing such a command. In this particular case, an "untimely start" is said to occur. The expression "untimely start" should be understood to mean a parking brake release command issued by the system which surprises the driver because it occurs at an instant when the conditions authorizing such a command are not satisfied.

It is therefore advantageous to analyze a posteriori the authorization conditions in the event of a parking brake release command in order to diagnose the operating state of the assisted starting system.

The British patent application GB 2 376 990 can be cited as an example, said application describing a system for controlling a parking brake in which the parking brake is released when the vehicle is moved by a positive displacement and the clutch pedal reaches a satisfactory position, but this document does not describe a means of diagnosing the operating state of an assisted starting system.

The British patent application GB 2 342 967 can also be cited which discloses a device for controlling a parking brake in which said brake is released when the braking torque applied to the wheels is below a certain threshold. Moreover, it is also possible to cite the French patent application FR 2 828 450 filed in the name of the applicant which describes a hill start assistance device and the French patent application FR 2 841 199, also filed in the name of the applicant, which discloses a device for automatically releasing the parking brake on starting the vehicle. However, these documents also do not disclose a means of diagnosing the operating state of an assisted starting system.

One of the aims of the invention is therefore to provide a system and a method for diagnosing the operating state of an assisted starting system.

Another aim of the invention is to be able to diagnose a posteriori the operating state of the assisted starting system to demonstrate good or bad operation of such a system.

The subject of the invention is therefore a method for diagnosing the operating state of an assisted starting system of a motor vehicle equipped with a controlled parking brake, comprising a step of calculating at least one vehicle information item and a validity step in which at least one validity information item associated with said vehicle information item is generated.

This method comprises a step of storing, in a non-volatile memory, the vehicle information items and the associated validity information items during a parking brake release command and a diagnostic step in which at least one diagnostic information item is produced from a check on the validity of the stored information items.

Such a process provides a simple and inexpensive method for easily and rapidly diagnosing the operating state of an assisted starting system. A check on the validity of the information items may be, for example, a comparison of a vehicle information item with its associated validity information item. From an a posteriori check on the validity of the previously stored information items, it is possible to diagnose whether an untimely start has occurred following a validity error, but also whether this untimely start occurred following a vehicle information item calculation error.

According to another embodiment, an analysis step is performed, after the storage step, in which at least one new validity information item is calculated from at least one stored information item and the diagnostic step is performed in which at least one diagnostic information item is produced from a comparison of the new validity information item with at least one stored information item.

Such a method also makes it possible to detect an assisted starting system error or a vehicle information item calculation error. This method can be added to the previous one to increase the reliability of the diagnosis. It also makes it possible to control the assisted starting system, and to calculate a vehicle information item, by performing an identical a posteriori calculation from the stored information items. These stored information items represent the trace of the operating conditions of the assisted starting system.

According to yet another embodiment, the method comprises a step of measuring at least one other vehicle information item and, during the analysis step, at least one new validity information item is calculated from at least one current information item.

Thus, when the assisted starting system is equipped with a sensor for measuring an information item, such a method makes it possible to detect a possible failure of the sensor. This method is particularly suited to checking whether a failure has occurred during a parking brake release command. Furthermore, this method makes it possible to detect whether this undetected failure has disappeared after the release command.

According to another characteristic, the assisted starting system is ordered to perform a new assisted start to obtain at least one additional validity information item, and, during the analysis step, at least one new validity information item is calculated from the additional information items.

It is possible, after the storage step, to perform an additional assisted start command to generate new information items in order to compare them with the previously stored information items.

According to yet another characteristic, the storage step is performed using a device embedded in the motor vehicle, and the analysis and diagnostic steps are then performed using a device located outside said vehicle.

In this case, a diagnosis can be produced, for example, during a general check on the state of the vehicle performed by a specialist garage. Thus, the specialist garage may be equipped with a suitable device which allows for an a posteriori diagnosis, following a complaint from a client regarding an untimely start, of the operating state of the assisted starting system.

According to yet another embodiment, the analysis step is performed with different calculation conditions.

It is thus possible to modify the starting conditions of the vehicle to reveal a validity error, a calculation error or a measurement error in the assisted starting system that would not have been detected during the brake release command.

According to another aspect, the subject of the invention is a system for diagnosing the operating state of an assisted starting system of a motor vehicle equipped with a controlled parking brake, the assisted starting system comprising at least one calculation means for calculating a vehicle information item intended for an assisted starting computer which is able to control the releasing of the parking brake and to generate at least one validity information item associated with said vehicle information item.

This system comprises a backup module for storing the vehicle information items and the associated validity information items in a nonvolatile memory during a parking brake release command, and a diagnostic module able to receive the stored information items comprising a checking module able to produce at least one diagnostic information item from a check on the validity of the stored information items.

According to another embodiment, said diagnostic module comprises an analysis module for calculating at least one new validity information item, from at least one stored information item, which is intended for the checking module also able to produce at least one diagnostic information item from a comparison of the new validity information item with at least one stored information item.

According to yet another embodiment, the assisted starting system comprises at least one sensor for measuring at least one other vehicle information item intended for the assisted starting computer and in which the diagnostic module is also able to receive the current vehicle information items and the associated current validity information items and the analysis module is able to calculate at least one new validity information item from at least one current information item.

According to another characteristic, the assisted starting computer is able to generate at least one additional validity information item during an additional parking brake release command and the analysis module is able to produce a new validity information item from the additional validity information items.

According to yet another characteristic, the backup module is embedded in the motor vehicle and the diagnostic module is located outside said vehicle.

According to yet another embodiment, the analysis module is capable of calculating the new validity information items with different calculation conditions.

Other aims, features and advantages of the invention will become apparent from reading the following description, given purely as a nonlimiting example and with reference to the appended drawings in which:

FIG. 1 shows a schematic view of a system 1 for diagnosing the operating state of an assisted starting system 2 of a motor vehicle.

Figure 1:
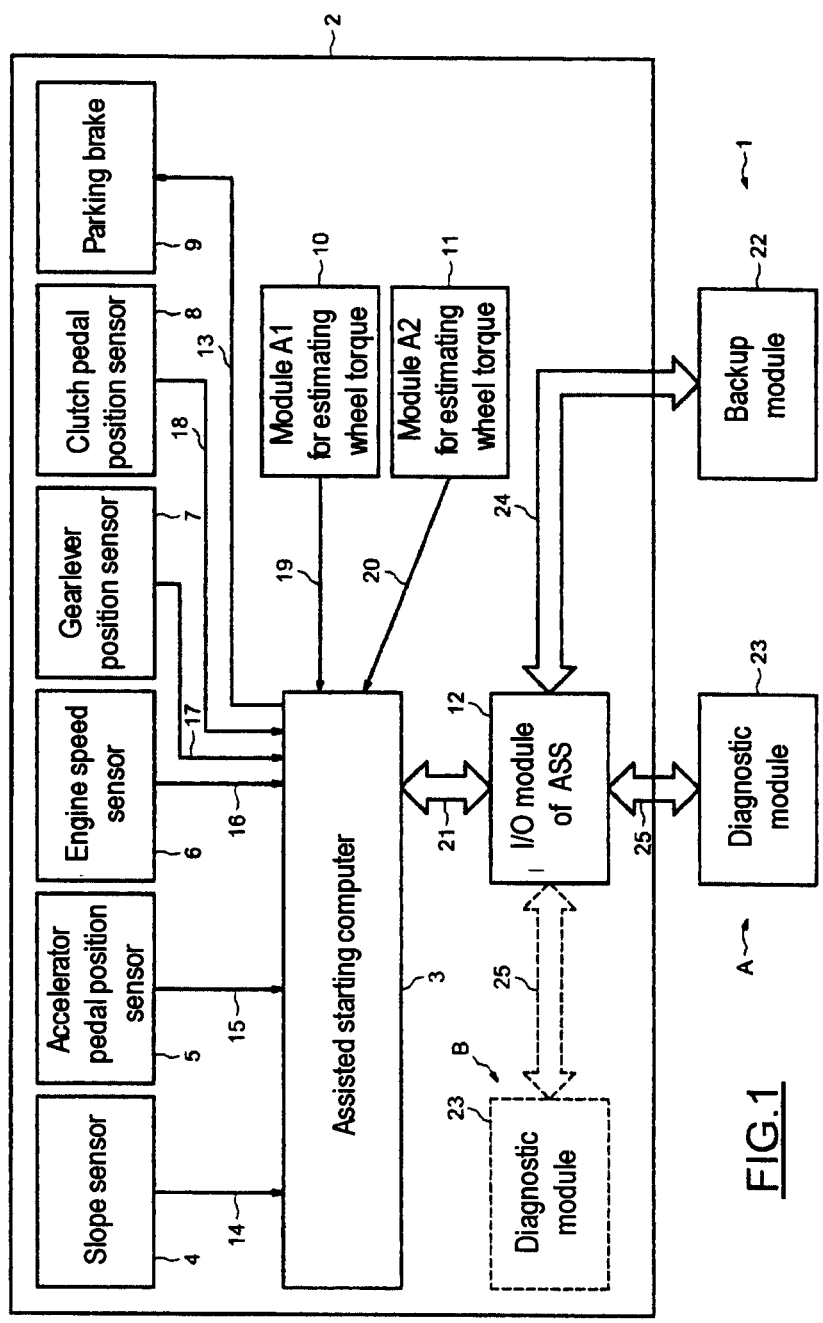
FIG. 1 is a schematic view of a diagnostic system according to the invention.

The assisted starting system 2 (or ASS) comprises an assisted starting computer 3, a plurality of sensors 4 to 8, an electrically controlled parking brake 9, calculation means 10 and 11 and an ASS input/output module 12. The assisted starting system 2 is embedded in the motor vehicle.

The assisted starting computer 3 hosts an algorithm for managing a parking brake 9 release or engage command. The assisted starting computer 3 issues the release/engage command, transmitted via a connection 13, toward the parking brake 9.

The assisted starting computer 3 receives vehicle information items originating from the sensors 4 to 8. The slope sensor 4 issues a measurement SlopeDA of the slope via a connection 14 toward the assisted starting computer 3. The accelerator pedal position sensor 5 issues a measurement AccPedPos of the position of the accelerator pedal via a connection 15 toward the assisted starting computer 3. The engine speed sensor 6 sends a measurement Nmot of the engine speed via a connection 16 toward the assisted starting computer 3. The gear lever position sensor 7 sends a measurement GLPos of the position of the gear lever via a connection 17 toward the assisted starting computer 3. The clutch pedal position sensor 8 sends a measurement ClutchPedPos of the position of the clutch pedal via a connection 18 toward the assisted starting computer 3.

The assisted starting computer 3 also receives vehicle information items originating from the calculation means 10 and 11, transmitted respectively via connections 19 and 20.

The calculation means 10 and 11 can produce or estimate vehicle information items from, in particular, calculation algorithms. These calculation means 10 and 11 are preferably incorporated in the assisted starting system, but they can also belong to other embedded systems of the vehicle, such as, for example, the vehicle's wheel anti-skid system.

According to a preferred embodiment, the assisted starting system comprises two estimation modules A1 and A2 for estimating the torque Twheels transmitted to the wheels of the vehicle.

The first estimation module A1 estimates the torque Twheels transmitted to the wheels from a method described in the patent application FR 2 841 199 cited previously. The assisted starting system may also comprise a second estimation module A2 for estimating the torque Twheels transmitted to the wheels from a method described in the patent application FR 2 828 450 cited previously. This second module A2 may be added to or replace the first estimation module A1. The use of the two modules in parallel makes it possible to obtain two estimations of the torque transmitted to the wheels from different methods, thus offering redundancy in the estimation of the torque transmitted to the wheels to increase the reliability of the assisted starting system.

The first estimation module A1, based on the method of the patent application FR 2 841 199, supplies an estimation of the torque Twheels transmitted to the wheels from the time derivative of the engine speed, from the engine torque and from the engine inertia.

The second estimation module A2, based on the method of the patent application FR 2 828 450, provides an estimation of the torque Twheels transmitted to the wheels from a measurement of the position of the clutch pedal, performed by virtue of a sensor, and a clutch curve.

It is also possible to envisage other means for producing the information item concerning the torque Twheels transmitted to the wheels, for example by using a torque sensor on the wheels or any other algorithm for calculating said torque Twheels.

Furthermore, the assisted starting computer 3 is able to generate at least one validity information item associated with each of the vehicle information items received from a sensor or from a calculation means. These validity information items are used by the assisted starting computer 3 to test the starting conditions before sending a parking brake 9 release or engage command. If the test of the validity information items is valid, a release command is sent to release the parking brake 9.

The input/output module 12 of the ASS is connected to the assisted starting computer 3 by a connection 21 for receiving the vehicle information items measured by the sensors 4 to 8 and produced by the estimation modules A1 and A2, as well as the validity information items generated by the assisted starting computer 3. The input/output module 12 of the ASS transmits vehicle and validity information items to the diagnostic system 1. The input/output module 12 of the ASS also receives the parking brake release/engage command via the connection 21 and can transmit it to the diagnostic system 1.

The diagnostic system 1 comprises a backup module 22 and a diagnostic module 23.

In a preferred embodiment, denoted A in the figure, the backup module 22 is embedded in the vehicle, the latter being able to be embedded in the assisted starting system 2, and the diagnostic module 23 is located outside the vehicle. For example, the diagnostic module may be embedded in a computer within a laptop computer.

In a variant, denoted B, the backup module 22 and the diagnostic module 23 are embedded in the vehicle. Furthermore, the diagnostic module 23 may be embedded in the assisted starting system 2.

The backup module 22 is connected to the input/output module 12 of the ASS by a connection 24.

The backup module 22 receives, via the connection 24, the parking brake 9 release/engage command, the vehicle information items originating from the sensors 4 to 8 and from the estimation modules A1 and A2, as well as the validity information items generated by the assisted starting computer 3. The backup module 22 may also transmit, via the connection 24, all its stored information items to the input/output module 12 of the ASS.

Similarly, the diagnostic module 23 is connected to the input/output module 12 of the ASS to receive, via a connection 25, the parking brake 9 release/engage command, the vehicle information items and the validity information items. The information items and the release/engage command received by the diagnostic module 23 may originate either from the assisted starting computer 3, denoted current information items, or from the backup module 22, denoted stored information items.

Figure 2:
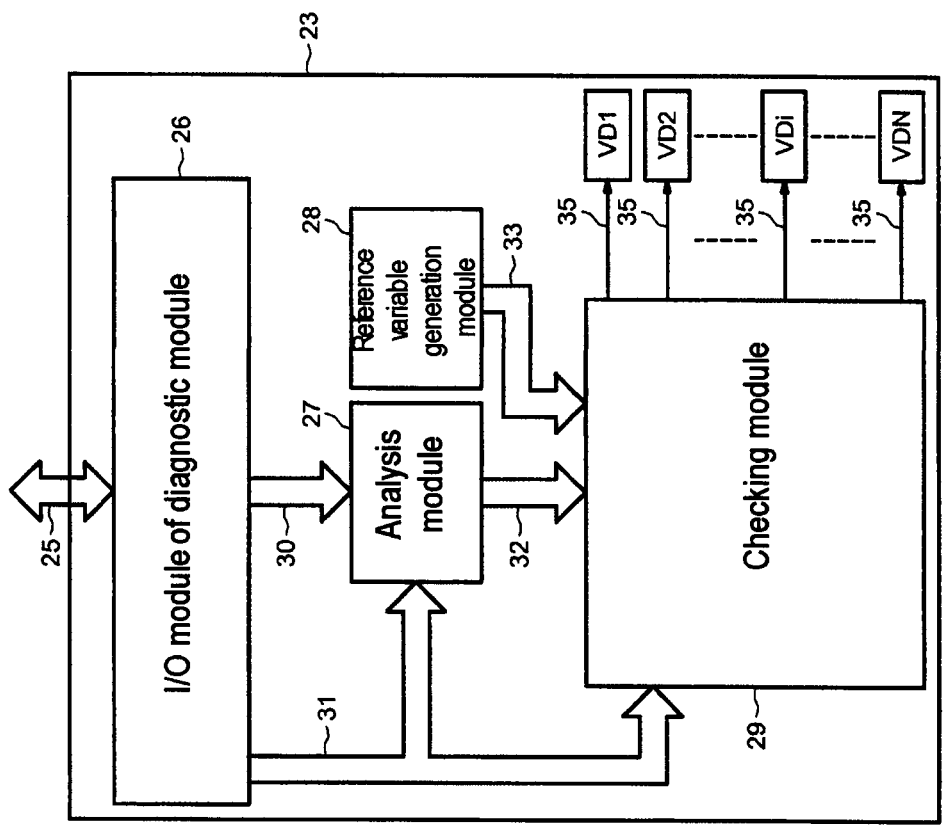
FIG. 2 is a schematic view of one embodiment of a diagnostic module.

FIG. 2 shows a schematic view of one embodiment of a diagnostic module 23. The diagnostic module 23 comprises an input/output module 26 of the diagnostic module, an analysis module 27, a module 28 for generating reference variables and a checking module 29.

The input/output module 26 of the diagnostic module is connected to the input/output module 12 of the ASS, via the connection 25, for receiving the current information items originating from the assisted starting computer 3, as well as the stored information items originating from the backup module 22. The input/output module 26 of the diagnostic module may also transmit, via the connection 25, a start command to the assisted starting computer 3 so that the latter can generate an additional parking brake 9 release/engage command. This start command originating from the diagnostic module 23 makes it possible to perform an additional assisted start in starting conditions different from those that generated the stored information items. An additional assisted start makes it possible to generate additional current information items which can be compared to the stored information items in order to produce an a posteriori diagnosis.

The analysis module 27 is connected to the input/output module 26 of the diagnostic module to receive the current information items originating from the assisted starting computer 3, transmitted via a connection 30, and the stored information items originating from the backup module 22, transmitted via a connection 31. This analysis module 27 transmits, via a connection 32, calculated information items toward the checking module 29. The analysis module 27 is also able to directly transmit the current information items, originating from the assisted starting computer 3, to the checking module 29. The expression "direct transmission of an information item" should be understood to mean an information item that is not recalculated by the analysis module 27.

The module 28 is able to generate reference variables to transmit them, via a connection 33, to the checking module 29.

The checking module 29 also receives, via the connection 31, the stored information items originating from the input/output module 26 of the diagnostic module. The checking module 29 produces a plurality of diagnostic information items, denoted VD1, VD2, ..., VDi ..., VDN and transmits them, via connections 35, to the input/output module 26 of the diagnostic module.

The diagnostic information items may be transmitted to a laptop computer screen, or to a text-type computer file. When the diagnostic module is embedded in the vehicle, provision can be made for a visual, audible or tactile alarm to be generated to warn the driver.

Figure 3:
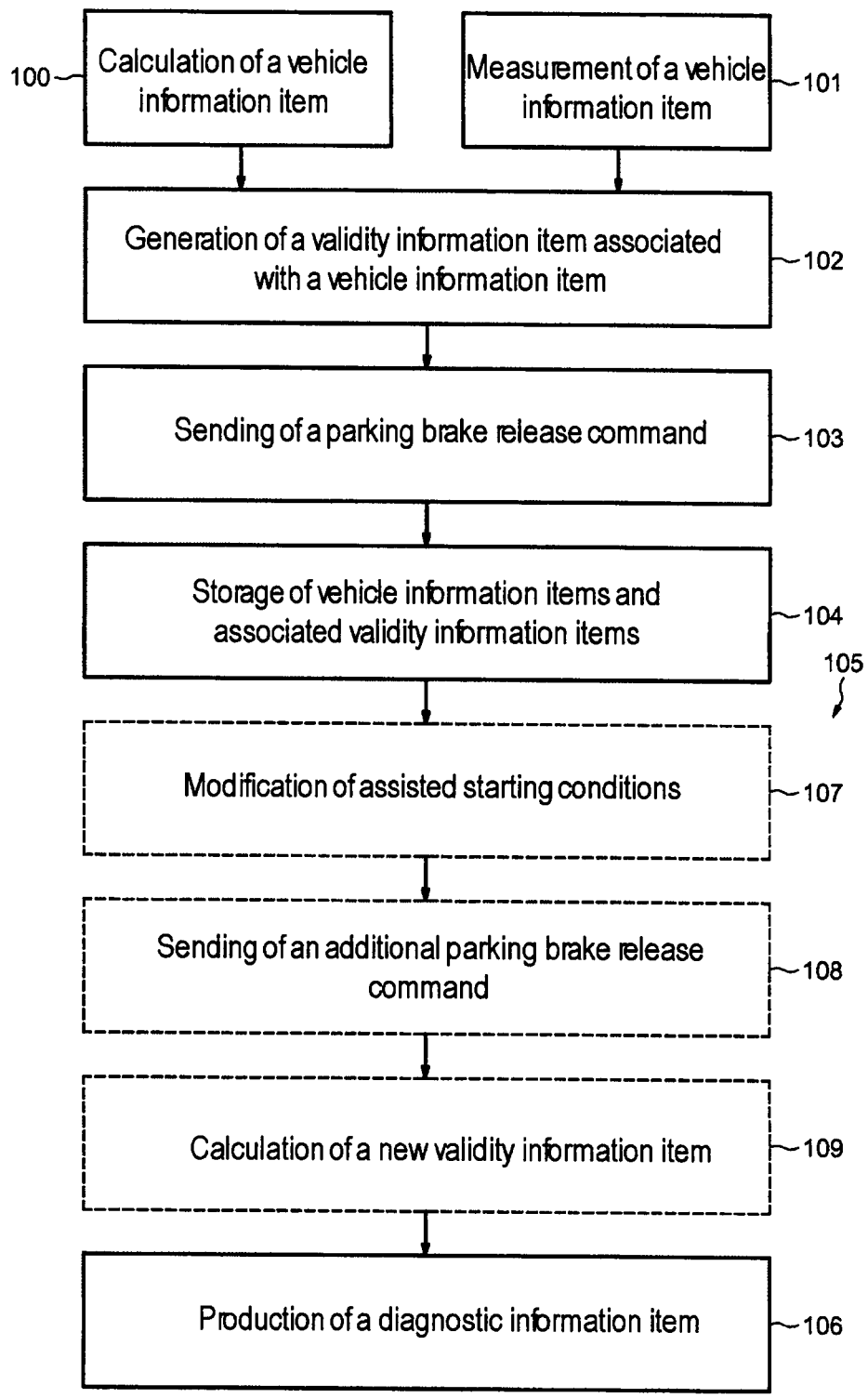
FIG. 3 is a flow diagram illustrating the main phases of a diagnostic method according to the invention.

FIG. 3 shows a flow diagram illustrating the main phases of a method for diagnosing the operating state of an assisted starting system 2 described previously.

The method begins with the steps 100 and 101 in which a calculation of a vehicle information item from a calculation means and a measurement of a vehicle information item from a sensor are respectively performed. Then, a next step 102 is performed in which a validity information item associated with each of the vehicle information items is generated. When the starting conditions are satisfied, a step 103 is performed in which a parking brake release command is sent. Then, a step 104 is performed to store the vehicle information items and the associated information items that are useful in order to produce a diagnosis of the operation of the assisted starting system 2. Then, a step 105 is performed to check the validity of the stored information items and a diagnostic step 106 is performed in which a diagnostic information item is produced for each checking step 105.

The checking step 105 may comprise a number of optional steps 107 to 109 depending on the stored information items. During the checking step 105 it is possible, for example, to compare the stored information items with one another, then perform the diagnosis step 106. It is also possible to perform the step 109 to calculate a new validity information item from the stored information items and compare these new information items with the previously stored information items. It is even possible to perform the step 107 in which the starting conditions are modified, for example by placing the vehicle on a slope of different inclination, or by placing the gear lever in the "neutral" position. After this modification step 107, the step 108 is performed in which an additional parking brake release command is sent. The step 108 makes it possible to generate new information items, performed in different conditions, then these new information items are compared with the previously stored information items.

The general principle of the diagnostic method is to test, via the assisted starting computer 3, the validity of the vehicle information items received before sending a release/engage command to the parking brake 9. When a release/engage command is sent, the vehicle and associated validity information items are stored, via the backup module 22, in a nonvolatile memory of EEPROM, or electrically erasable programmable read only memory type. Then, when an untimely start occurs, the stored data is analyzed in order to diagnose the operating state of the assisted starting system 2.

Several types of untimely starts can be distinguished according to the failure of one of the vehicle information item production sources. The main vehicle information item production sources are measurement sensors, modules for estimating the torque transmitted to the wheels and the assisted starting computer.

Three types of untimely starts are considered according to the defective source:

- Type I: untimely start following an undetected failure of a sensor. For example, when the vehicle is stopped, the gear lever is in the "neutral" position and the parking brake is engaged. In these conditions, if the gearbox contactor is blocked in a "gear engaged" position just before the start, a simple press on the accelerator pedal may lead to a parking brake release command. This failure is normally detected, a posteriori, when the vehicle is in rolling condition, when the neutral point and gear engaged contactors supply contradictory messages
- Type II: untimely start following an overestimation of the torque transmitted to the wheels. The release command is sent too early, when the real torque transmitted to the wheels is less than the torque due to the slope, leading to an unexpected reversal of the vehicle
- Type III: untimely start following a failure of the assisted starting computer. The conditions for performing an assisted start are not all correctly validated by the computer.

A nonexhaustive list of the information items stored using the backup module 22 is given below. The backup module 22 is also able to store the vehicle information items according to the estimation module used. Indeed, the vehicle information items differ according to the estimation module used.

Below is an exemplary list of the vehicle information items measured by the sensors 4 to 7. These measured information items are stored regardless of the estimation module used:

- SlopeDA: slope or inclination of the road on which the vehicle is travelling relative to the horizontal
- AccPedPos: accelerator pedal position
- GLPos: gear lever position
- Nmot: engine speed.

An exemplary list of the validity information items generated by the assisted starting computer 3 is given below. These calculated information items are stored regardless of the estimation module used:

- TotalDistance: distance traveled by the vehicle
- SlopeValDA: Boolean validity signal for the SlopeDA information item, which has the value:
  - 0 if the SlopeDA information item is invalid
  - 1 if the SlopeDA information item is valid
- AccPedPosVal: Boolean validity signal for the AccPedPos information item, which has the value:
  - 0 if the AccPedPos information item is invalid
  - 1 if the AccPedPos information item is valid
- AccPedPosThres: accelerator pedal position threshold produced by the assisted starting computer 3
- GLPosVal: Boolean validity signal for the GLPos information item, which has the value:
  - 0 if the GLPos information item is invalid
  - 1 if the GLPos information item is valid
- NmotVal: Boolean validity signal for the Nmot information item, which has the value:
  - 0 if the Nmot information item is invalid
  - 1 if the Nmot information item is valid
- NmotThres: engine speed threshold produced by the assisted starting computer 3 according to the slope.

When the first estimation module A1 is used, the torque transmitted to the wheels is estimated from a clutch curve which links the position of the clutch pedal and the maximum torque that can be transmitted by the clutch in that position. For an a posteriori calculation of the torque transmitted to the wheels, it is therefore necessary to store the clutch curve during the assisted start.

An exemplary list of the information items that are stored only when the first estimation module A1 is used is given below:

Information Item Measured by the Sensor 8:
- ClutchPedPos: clutch pedal position.

Information Items Generated by the Assisted Starting Computer:
- ClutchPedPosVal: Boolean validity signal for the ClutchPedPos information item, which has the value:
  - 0 if the ClutchPedPos information item is invalid
  - 1 if the ClutchPedPos information item is valid
- ClutchPedPosThres: clutch pedal position threshold produced by the assisted starting computer 3
- AntClutchPedPos: anticipated position of the clutch pedal produced by the assisted starting computer 3
- TwheelsThres: threshold of the torque to be transmitted to the wheels produced by the assisted starting computer 3 according to the slope.

Information Items Generated by the First Estimation Module A1:
- Twheels: estimation of the torque transmitted to the wheels
- ClutchCurve: clutch curve generated by the first estimation module A1.

When the second estimation module A2 is used, the torque transmitted to the wheels is estimated from the time derivative of the engine speed, and from the engine torque. For a posteriori calculation of the torque transmitted to the wheels, it is therefore necessary to store a history of the engine speed during the assisted start.

An exemplary list of the information items that are stored only when the second estimation module A2 is used is given below:

Information Items Measured by the Sensor 6:
- Nmot(1 . . . n): history over n samples of the engine speed during the assisted start. The storage of the n samples makes it possible to calculate the time drift of the engine speed. The value Nmot(1) corresponds to the value of the engine speed measured during the parking brake 9 release command
- CME: engine torque Information Items Generated by the Assisted Starting Computer:
- TwheelsThres: threshold of the torque to be transmitted to the wheels produced by the assisted starting computer 3 according to the slope.

Information Item Generated by the Second Estimation Module A2:
- Twheels: estimation of the torque transmitted to the wheels.

FIGS. 4 to 8 show flow diagrams illustrating exemplary implementations of the diagnostic step.

The diagnostic step consists in performing a check for a stored information item and in producing an associated diagnostic information item VDi. The associated information item VDi can be coded as follows:

VDi: diagnostic information item associated with a check which has the value:
   0 if the operating state of the assisted starting system is valid
   1 if a type I untimely start occurs following a failure of a sensor
   2 if a type II untimely start occurs following an overestimation of the torque transmitted to the wheels by an estimation module
   3 if a type II untimely start occurs following a failure of the assisted starting computer.

The checks are performed by the checking module 27. The assisted starting computer 3 may receive a plurality of information items, the module 27 for checking the information items may comprise a number of checks of different types.

FIGS. 4 to 8 show five types of checks.

Figure 4:
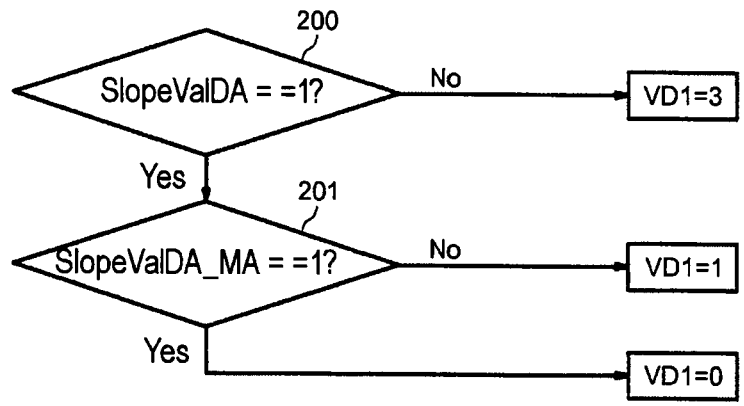
FIGS. 4 to 8 are flow diagrams illustrating exemplary implementations of the diagnostic step.

FIG. 4 shows a first type of check in which a stored validity information item is compared with the corresponding current validity information item which originates directly from the analysis module 25.

This first type of check can be used to check different vehicle information items measured by a sensor. FIG. 4 describes an exemplary application of this first type of check applied to the SlopeDA information item.

In FIG. 4, the SlopeDA information item is checked and a diagnostic information item VD1 is produced according to the result of the check. When the parking brake release command has been given, the stored validity information item SlopeValDA must be considered reliable. To detect a failure of the slope sensor 4, the stored value SlopeValDA is then compared with the current value SlopeValDA_MA originating from the analysis module 27.

During a step 200, a check is carried out to see if the SlopeValDA information item is valid. If the SlopeValDA information item is invalid, the information item VD1 has the value 3, otherwise a next step 201 is performed. During the step 201, a check is carried out to see if the SlopeValDA_MA information item is valid. If the SlopeValDA_MA information item is invalid, then the information item VD1 has the value 1, otherwise the information item VD1 has the value 0.

Figure 5:
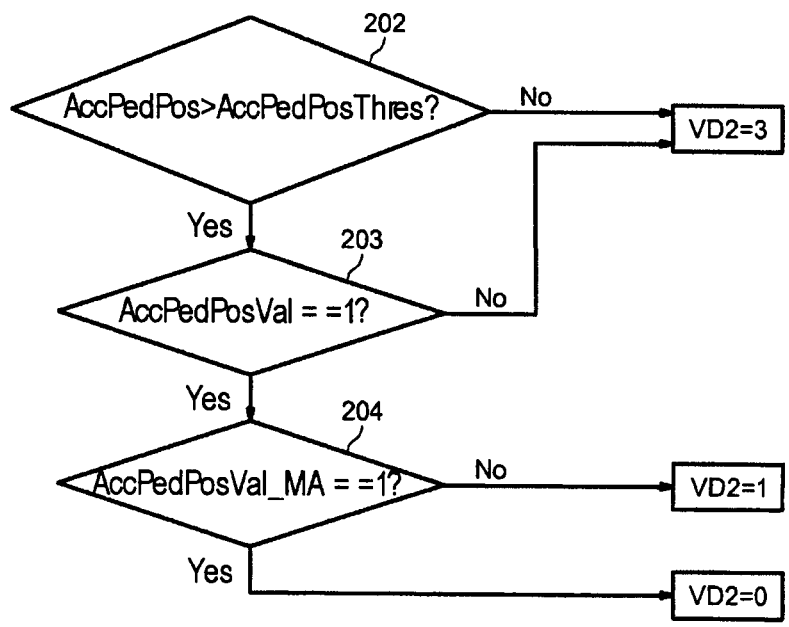

FIG. 5 shows a second type of check in which, during a first step, a stored measured information item is compared with a first stored validity information item, then a second stored validity information item is compared with the corresponding current validity information item which originates from the analysis module 27.

This second type of check can be used to check, on the one hand, various vehicle information items measured by a sensor and on the other hand the associated validity information item. FIG. 5 describes an exemplary application of this second type of check applied to the AccPedPos information item.

In FIG. 5, the AccPedPos information item is checked and a diagnostic information item VD2 is produced according to the result of the check. When the parking brake release command has been given, the accelerator pedal position AccPedPos should be greater than a threshold AccPedPosThres and the stored validity information item AccPedPosVal should be considered reliable. To detect a failure of the accelerator pedal position sensor 5, the stored value AccPedPosVal is compared with the current value AccPedPosVal_MA originating from the analysis module 27.

During a step 202, the information item AccPedPos is compared with the threshold AccPedPosThres. If the AccPedPos information item is below or equal to the AccPedPosThres threshold, then the information item VD2 has the value 3, otherwise a next step 203 is performed.

During the step 203, a check is carried out to see if the AccPedPosVal information item is valid. If the AccPedPosVal information item is invalid, then the information item VD2 has the value 3, otherwise a next step 204 is performed. During the step 204, a check is carried out to see if the AccPedPosVal_MA information item is valid. If the AccPedPosVal_MA information item is invalid, then the information item VD2 has the value 1, otherwise the information item VD2 has the value 0.

A failure of another sensor 4 to 8 can be detected in a manner similar to this second type of check. The assisted starting system 2 uses a different set of information items for each sensor. These information items have a different name but a similar role to the information items described in the second type of check. This second type of check described in FIG. 5 can be applied for other sensors, by adapting the information items used.

When the gear lever position sensor 7 is used, it is possible to perform a check, in a manner similar to the second type of check, on the GLPos information item and produce a diagnostic information item VD3 according to the result of the check. When the parking brake release command has been given, a gear ratio should be engaged, that is to say that the GLPos information item should be different from the Neutral_Point position. This condition may be made stricter by imposing a start only in first gear or in reverse gear. Furthermore, the stored validity information item GLPosVal should be considered reliable. To detect a failure of the gear lever position sensor 7, the stored value GLPosVal is then compared with the current value GLPosVal_MA originating from the analysis module 27.

The GLPos information item is compared with the Neutral_Point threshold. If the GLPos information item is different from the Neutral_Point threshold, then the information item VD3 has the value 3, otherwise a next step is performed.

During the next step, a check is carried out to see if the GLPosVal information item is valid. If the GLPosVal information item is invalid, then the information item VD3 has the value 3, otherwise another next step is performed. During the other next step, a check is carried out to see if the GLPosVal_MA information item is valid. If the GLPosVal_MA information item is invalid, then the information item VD3 has the value 1, otherwise the information item VD3 has the value 0.

When the engine speed sensor 6 is used, it is possible to perform a check, similar to the second check, on the Nmot information item and produce a diagnostic information item VD4 according to the result of the check. When the parking brake release command has been given, the engine speed Nmot should be greater than a threshold NmotThres and the stored validity information item NmotVal should be considered reliable. To detect a failure of the engine speed sensor 6, the stored value NmotVal is then compared with the current value NmotVal_MA originating from the analysis module 27.

The Nmot information item is compared with the threshold NmotThres. If the Nmot information item is below or equal to the threshold NmotThres, then the information item VD4 has the value 3, otherwise a next step is performed.

During the next step, a check is carried out to see if the NmotVal information item is valid. If the NmotVal information item is invalid, then the information item VD4 has the value 3, otherwise another next step is performed. During the other next step, a check is carried out to see if the NmotVal_MA information item is valid. If the NmotVal_MA information item is invalid, then the information item VD4 has the value 1, otherwise the information item VD4 has the value 0.

When the clutch pedal position sensor 8 is used, it is possible to perform a check, similar to the second check, on the information item ClutchPedPos and produce a diagnostic information item VD5 according to the result of the check. When the parking brake release command has been given, the clutch pedal position ClutchPedPos should be greater than a threshold ClutchPedPosThres and the stored validity information item ClutchPedPosVal should be considered reliable. To detect a failure of the clutch pedal position sensor 8, the stored value ClutchPedPosVal is then compared with the current value ClutchPedPosVal_MA originating from the analysis module 27.

The ClutchPedPos information item is compared with the threshold ClutchPedPosThre. If the ClutchPedPos information item is below or equal to the threshold ClutchPedPosThres, then the information item VD5 has the value 3, otherwise a next step is performed.

During the next step, a check is carried out to see if the ClutchPedPosVal information item is valid. If the ClutchPedPosVal information item is invalid, then the information item VD5 has the value 3, otherwise another next step is performed. During the other next step, a check is carried out to see if the ClutchPedPosVal_MA information item is valid. If the ClutchPedPosVal_MA information item is invalid, then the information item VD5 has the value 1, otherwise the information item VD5 has the value 0.

Figure 6:
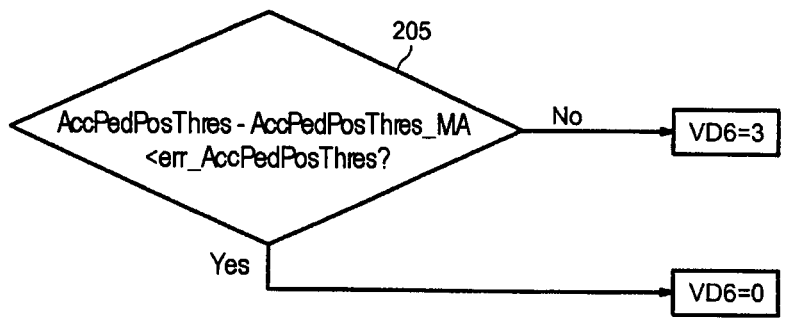

FIG. 6 shows a third type of check in which, during a first step, a new validity information item is calculated from a stored information item or from a current information item, using the analysis module 27. In a second step, the difference is established between a stored validity information item and said new validity information item. Then, this difference is compared with a reference threshold. The reference threshold is generated by the reference variable generation module 28.

This third type of check can be used to check different validity information items generated by the assisted starting computer 3. FIG. 6 describes an exemplary application of this third type of check applied to the AccPedPosThres information item.

In FIG. 6, the AccPedPosThres information item is checked and a diagnostic information item VD6 is produced according to the result of the check.

When the parking brake release command has been given, the threshold AccPedPosThres should be reliable. A checking step 205 is performed in which the following comparison is made:

$$abs(AccPedPosThres-AccPedPosThres\_MA(SlopeDA,Nmot))<err\_AccPedPosThres$$

with:
abs: the absolute value function
AccPedPosThres MA(SlopeDA,Nmot): accelerator pedal position threshold value calculated by the analysis module 27. This calculation is established using a map which gives the threshold of the accelerator pedal according to the stored slope SlopeDA and the stored engine speed Nmot
err_AccPedPosThres: the accepted deviation generated by the module 28.

If the check is not valid, then the information item VD6 has the value 3, otherwise the information item VD6 has the rate 0.

Furthermore, it is possible to apply, in a manner similar to the check described in FIG. 6, this third type of check to the TwheelsThres information item. It is therefore thus possible to check the TwheelsThres information item and produce a diagnostic information item VD7 according to the result of the check.

When the parking brake release command has been given, the threshold TwheelsThres should be reliable. A checking step is performed in which the following comparison is made:

$$abs(TwheelsThres-TwheelsThres\_MA)(SlopeDA))<err\_TwheelsThres$$

with:
abs: the absolute value function
TwheelsThres_MA(SlopeDA): threshold value for the torque to be transmitted to the wheels calculated by the analysis module 27. This calculation is established using a map which gives the threshold of the torque to be transmitted to the wheels according to the stored slope SlopeDA
err_TwheelsThres: the accepted deviation generated by the module 28.

If the check is not valid, then the information item VD7 has the value 3, otherwise the information item VD7 has the value 0.

It is also possible to apply, in a manner similar to the check described in FIG. 6, this third type of check to the Twheels information item. It is therefore thus possible to check the Twheels information item and produce a diagnostic information item VD8 according to the result of the check.

When the parking brake release command has been given, the torque on the wheels Twheels should be reliable. A checking step is performed in which the following comparison is made:

$$abs(Twheels-Twheels\_MA(ClutchCurve,AntClutchPedPos))<err\_Twheels$$

with:
abs: the absolute value function
Twheels MA(ClutchCurve,AntClutchPedPos): which corresponds to the torque to be transmitted to the wheels calculated by the analysis module 27. This calculation is performed using a linear interpolation of the stored clutch curve ClutchCurve which is assessed at the stored anticipated clutch pedal position AntClutchPedPos
err_Twheels: the accepted deviation generated by the module 28.

If the check is not valid, then the information item VD8 has the value 3, otherwise the information item VD8 has the value 0.

It is also possible to apply, in a manner similar to the check described in FIG. 6, this third type of check to the ClutchCurve information item. It is therefore thus possible to check the ClutchCurve information item and produce a diagnostic information item VD9 according to the result of the check.

When the parking brake release command has been given, the clutch curve ClutchCurve should be reliable. A checking step is performed in which the following comparison is made:

$$abs(Twheels\_MA(ClutchCurveMA,AntClutchPedPos)-Twheels\_MA(ClutchCurve,AntClutchPedPos))<err\_Torque$$

with:
abs: the absolute value function
Twheels_MA(ClutchCurve,AntClutchPedPos): the estimation of the torque transmitted to the wheels obtained by virtue of the linear interpolation of the stored clutch curve ClutchCurve. This estimation is assessed in the stored anticipated clutch pedal position AntClutchPedPos ClutchCurve_MA: new clutch curve supplied by the module 28

Twheels_MA(ClutchCurve_MA,AntClutchPedPos): the estimation of the torque transmitted to the wheels obtained by virtue of the linear interpolation of the new clutch curve ClutchCurve_MA. This estimation is assessed in the stored anticipated clutch pedal position AntClutchPedPos err_Torque: the accepted deviation generated by the module 28.

If the check is not valid, then the information item VD9 has the value 2 to signal an overestimation of the torque transmitted to the wheels because of a slow learning of the clutch curve, otherwise the information item VD9 has the value 0.

Figure 7:
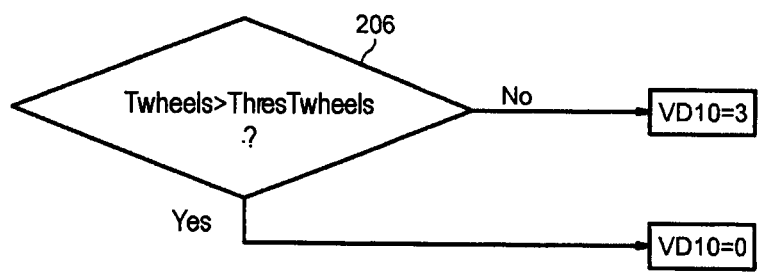

FIG. 7 shows a fourth type of check in which a stored information item, calculated by an estimation module, is compared with a stored validity information item.

This fourth type of check can be used to check different vehicle information items calculated by calculation means 10 and 11. FIG. 7 describes an exemplary application of this fourth type of check applied to the Twheels information item.

In FIG. 7, the Twheels information item is checked and a diagnostic information item VD10 is produced according to the result of the check. When the parking brake release command has been given, the torque Twheels transmitted to the wheels should be above a threshold TwheelsThres, that is to say that the stored information item Twheels should be considered reliable.

In a step 206, a check is carried out to see if the following condition is valid: Twheels>TwheelsThres If the condition is invalid, then the information item VD10 has the value 3, otherwise the information item VD10 has the value 0.

Figure 8:
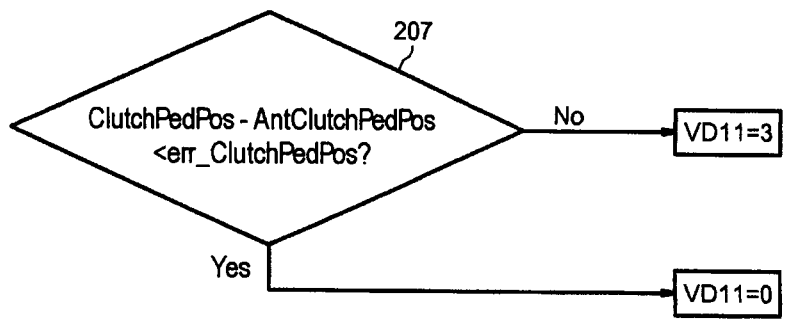

FIG. 8 shows a fifth type of check in which, during a first step, the difference between a stored vehicle information item and a stored validity information item is established. Then, this difference is compared with a reference threshold. The reference threshold is generated by the reference variable generation module 28.

This fifth type of check can be used to check different vehicle information items of the vehicle measured by a sensor. FIG. 8 describes an exemplary application of this fifth type of check applied to the ClutchPedPos information item.

In FIG. 8, the ClutchPedPos information item is checked and a diagnostic information item VD11 is produced according to the result of the check.

When the parking brake release command has been given, the difference between the anticipated clutch pedal position AntClutchPedPos and the real clutch pedal position ClutchPedPos should be strictly below a threshold err_ClutchPedPos.

In a step 207, a check is performed to see if the following condition is valid:

$$abs(ClutchPedPos-AntClutchPedPos)<err\_ClutchPedPos$$

with:
abs: absolute value function
ClutchPedPos and AntClutchPedPos are the stored information items
err_ClutchPedPos is the accepted difference generated by the module 28.

If the condition is not valid, then the information item VD11 has the value 3, otherwise the information item VD11 has the value 0.

Furthermore, this fifth type of check can be applied, in a manner similar to the check described in FIG. 8, to the Twheels information item when the second estimation module A2 is used. It is therefore thus possible to check the Twheels information item and produce a diagnostic information item VD12 according to the result of the check.

When the parking brake release command has been given, the torque on the wheels Twheels should correspond to the difference between the torque supplied by the engine CME and the time derivative of the engine speed dNmot/dt multiplied by the inertia of the engine Jm:

The following condition is therefore checked:

$$abs(Twheels-(CME-Jm*dNmot/dt))<err\_Torque$$

with:
abs: absolute value function
Jm engine inertia
dNmot/dt: the time derivative of the engine speed
err_Torque: the accepted difference generated by the module 28.

If the condition is not valid, then the information item VD12 has the value 3, otherwise the information item VD12 has the value 0.

The diagnostic system and method thus described are used mainly in the event of a complaint from the driver of the vehicle after one or more untimely starts. Preferably, the diagnostic module is not embedded in the vehicle but is located outside the vehicle. Thus, the diagnosis can be performed in a suitable garage.

The invention claimed is:

1. A method for diagnosing an operating state of an assisted starting system of a motor vehicle equipped with a controlled parking brake, comprising:
    calculating, using processing circuitry, at least one vehicle information item;
    generating, using the processing circuitry, at least one validity information item associated with the vehicle information item;
    storing, in nonvolatile memory, the at least one vehicle information item and the associated at least one validity information item responsive to a parking brake release command; and
    producing, using diagnostic circuitry, at least one diagnostic information item from a check on validity of the stored information items.

2. The diagnostic method as claimed in claim 1, wherein the at least one diagnostic information item is associated with a slope of a support surface on which the motor vehicle is supported.

3. The diagnostic method as claimed in claim 1, further comprising performing an analysis, after said storing, in which at least one new validity information item is calculated from at least one stored information item,
    wherein said producing at least one diagnostic information item is performed from a comparison of the new validity information item with the at least one stored information item.

4. The diagnostic method as claimed in claim 3, further comprising measuring at least one other vehicle information item as at least one current information item and, during said performing an analysis, at least one new validity information item is calculated from the at least one current information item.

5. The diagnostic method as claimed in claim 3,
wherein the assisted starting system is ordered to perform a new assisted start to obtain at least one additional validity information item, and
wherein during said performing the analysis, at least one new validity information item is calculated from the obtained at least one additional information item.

6. The diagnostic method as claimed in claim 3, wherein said storing is performed using a device embedded in the motor vehicle, and said performing the analysis and producing the at least one diagnostic information item are then performed using a device located outside the motor vehicle.

7. The diagnostic method as claimed in claim 3, wherein said performing the analysis is performed with different calculation conditions.

8. A system for diagnosing an operating state of an assisted starting system of a motor vehicle equipped with a controlled parking brake, the system comprising:
calculation circuitry that calculates a vehicle information item intended for an assisted starting computer configured to control releasing of the parking brake and to generate at least one validity information item associated with the vehicle information item;
backup circuitry that stores the vehicle information item and the associated validity information item in non-volatile memory circuitry responsive to a parking brake release command; and
diagnostic circuitry that receives the stored information items and that includes checking circuitry configured to produce at least one diagnostic information item from a check on the validity of the stored information items.

9. The diagnostic system as claimed in claim 8, wherein the backup circuitry is embedded in the motor vehicle and the diagnostic circuitry is located outside the motor vehicle.

10. The diagnostic system as claimed in claim 8, wherein the at least one diagnostic information item is associated with a slope of a support surface on which the motor vehicle is supported.

11. The diagnostic system as claimed in claim 8, wherein the diagnostic circuitry includes analysis circuitry configured to calculate at least one new validity information item, from at least one stored information item, which is intended for the checking circuitry, and to produce at least one diagnostic information item from a comparison of the new validity information item with the at least one stored information item.

12. The diagnostic system as claimed in claim 11, further comprising at least one sensor that measures at least one other vehicle information item intended for the assisted starting computer,
wherein the diagnostic circuitry is further configured to receive the current vehicle information items and the associated current validity information items, and the analysis circuitry is configured to calculate at least one new validity information item from at least one current information item.

13. The diagnostic system as claimed in claim 11, wherein the assisted starting computer is configured to generate at least one additional validity information item responsive to an additional parking brake release command, and the analysis circuitry is configured to produce a new validity information item from the additional validity information items.

14. The diagnostic system as claimed in claim 11, wherein the analysis circuitry is configured to calculate the new validity information items with different calculation conditions.

\* \* \* \* \*